United States Patent
Lowther et al.

(10) Patent No.: US 11,630,697 B2
(45) Date of Patent: Apr. 18, 2023

(54) SYSTEM AND METHOD OF DYNAMIC CONTEXT WORKFLOW AUTOMATION

(71) Applicant: RackN, Inc., Austin, TX (US)

(72) Inventors: Victor L. Lowther, Round Rock, TX (US); Gregory S. Althaus, Austin, TX (US); Robert A. Hirschfeld, Austin, TX (US)

(73) Assignee: RACKN, INC., Austin, TX (US)

( * ) Notice: Subject to any disclaimer, the term of this patent is extended or adjusted under 35 U.S.C. 154(b) by 323 days.

(21) Appl. No.: 17/016,434

(22) Filed: Sep. 10, 2020

(65) Prior Publication Data

US 2021/0081245 A1 Mar. 18, 2021

Related U.S. Application Data

(60) Provisional application No. 62/899,891, filed on Sep. 13, 2019.

(51) Int. Cl.
*G06F 9/50* (2006.01)
*G06F 9/445* (2018.01)

(52) U.S. Cl.
CPC ........ *G06F 9/5011* (2013.01); *G06F 9/44505* (2013.01)

(58) Field of Classification Search
CPC .................................................... G06F 9/5011
See application file for complete search history.

(56) References Cited

U.S. PATENT DOCUMENTS

2018/0101395 A1\* 4/2018 Aleksandrov ......... G06F 9/5077

\* cited by examiner

*Primary Examiner* — Charlie Sun
(74) *Attorney, Agent, or Firm* — Gary Stanford; Huffman Law Group, PC

(57) ABSTRACT

A system for dynamic context automation workflow including a data center which includes an infrastructure and a configuration platform. The infrastructure includes physical resources for implementing at least one machine, and the configuration platform includes a configuration processor that coordinates automatic sequential execution of multiple tasks of a workflow by different agents each running on a different one of multiple contexts for updating a machine state controlled by the configuration processor.

24 Claims, 10 Drawing Sheets

SYSTEM AND METHOD OF DYNAMIC CONTEXT WORKFLOW AUTOMATION

CROSS REFERENCE TO RELATED APPLICATION(S)

This application claims benefit of U.S. Provisional Application Ser. No. 62/899,891, filed on Sep. 13, 2019, which is hereby incorporated by reference in its entirety for all intents and purposes. This application is related to U.S. patent application Ser. No. 16/715,299, filed on Dec. 16, 2019, entitled "Distributed Federation of Endpoints with Proxy Synchronization," which is hereby incorporated by reference in its entirety for all intents and purposes. This application is related to U.S. patent application Ser. No. 16/917,500, filed on Jun. 30, 2020, entitled "System and Method of Distributed Edge Configuration Management," which is hereby incorporated by reference in its entirety for all intents and purposes.

BACKGROUND OF THE INVENTION

Field of the Invention

The present invention relates in general to data center automation, and more particularly to a system and method of dynamic context workflow automation in which the context of each task of a workflow being performed is automatically and dynamically changed for execution of the task.

Description of the Related Art

A data center is a collection of machines and other resources for performing computational work. As used herein, the term "machine" is an apparatus consisting of interrelated parts with separate functions used in the performance of or to facilitate some kind of computational work, including computers and computer servers and the like. A machine may be a physical machine (PM) or a virtual machine (VM). A virtual machine is configured in software to emulate a physical machine. A data center may include, for example, an infrastructure which further includes computational resources, computer systems, servers, storage devices, network communication and network access devices, etc. The computational work may include various applications including performance of various tasks including complex tasks, operation and management of websites, virtual computer execution, access and control, etc.

A data center may be located at any one or more of several different site configurations, such as, for example, a home, an automobile, a ship, a space craft, a cell tower, an office or office building, a retail location, a computer center or building, etc. The term "site" is often used interchangeably with the term "data center," although a site generally refers to a physical location or platform which typically includes one data center but may include more than one separate data centers. A federation is a collection of data centers operating in a coordinated manner without tight coupling and without synchronized management.

Cloud computing introduced the concept of large scale data centers with Application Programming Interface (API) based infrastructure control. Such architecture provided advantages for control and automation using virtualization and infrastructure APIs from a centralized API.

Operators of data centers seek the ability to provision and manage machines of the data center including provisioning and managing Infrastructure as Code (IaC). Conventional data center tools operate in a single context in which a "context" is defined as a process space such as an execution location or an operating environment. When tools operate in a single context, they cannot get information or take actions that should be used to complete the workflow autonomously. The consequence is that data had to be duplicated in multiple systems or manual steps had to be added and taken to ensure multiple systems were synchronized with each other. In many cases, adequate APIs exist to automate the process but the workflow is being executed in a security zones or within environments in which content cannot access the APIs.

SUMMARY OF THE INVENTION

A system for dynamic context automation workflow according to one embodiment includes a data center including an infrastructure and a configuration platform. The infrastructure includes physical resources for implementing at least one machine, and the configuration platform includes a configuration processor that coordinates automatic sequential execution of multiple tasks of a workflow by different agents each running on a different one of multiple contexts for updating a machine state controlled by the configuration processor.

In one embodiment, for each task of the workflow, the configuration processor determines a context for executing a next task, provides access to the next task and a current instance of the machine state to an agent of the determined context, receives machine state update information from the agent of the determined context after execution of the next task, and updates the machine state using the received machine state update information.

The configuration processor may generate the workflow from stored configuration information in response to a command. The configuration processor may generate the workflow and the machine state as a placeholder in response to a provisioning command, in which case the workflow includes at least one task that is executed and completed by a first agent in a first context before the machine is actually provisioned within the infrastructure.

The context may be a managed process located within the data center and outside the configuration platform. The context may be a process located within the configuration platform. The context may be a machine implemented in the infrastructure. The context may be a process located in a second data center accessible via a communications network. Multiple contexts may each be located in a corresponding one of multiple data centers accessible via the communications network.

Each of one or more tasks may specifically identify the context in which the task is to be executed. The configuration processor may spawn a new process space for providing a context for executing at least one of the plurality of tasks.

The system may further include multiple machines of a cluster implemented in the infrastructure, multiple machine states each representing a corresponding machine, and a cluster state that represents the cluster and that includes references to each machine state. The configuration processor may coordinate automatic sequential execution of the tasks of the workflow for updating the cluster state on behalf of the machines of the cluster. One of the contexts may be a process space owned by the cluster state for performing at least one task of the workflow on behalf of the machines of the cluster.

The system may include a first data center with a first infrastructure and a second data center with a second infrastructure each for implementing at least one machine. A cluster may include multiple machines including at least one machine implemented in the first infrastructure and at least one machine implemented in the second infrastructure. Each implemented machine may be represented by a corresponding machine state. The system may further include a cluster state that represents the cluster and that includes references to each of the machine states in the first and second infrastructures. The configuration processor may coordinate automatic sequential execution of the tasks of the workflow for updating the cluster state on behalf of the machines of the cluster.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Historically, an automation chain or workflow including a sequence of operations or tasks was executed in one place or at one location. Some tasks of the workflow, however, may need to be performed on different platforms so that the context or operating environment must be changed before proceeding. The inventors have recognized the need to create automation that spans multiple control planes or logical locations into a single operational flow that automatically and dynamically changes context during execution. The inventors have therefore developed a system and method of dynamic workflow that can maintain execution state and also change contexts during execution. This is advantageous because many data center tasks may access restricted or specialized APIs within security zones with limited operational context. Allowing a single sequence to operate in different contexts improves security and offers additional control for operators.

The present disclosure describes an architecture and implementation of a Dynamic Context Automation Workflow (DCAW) process to be used by data center infrastructure management platforms such as Digital Rebar, which is a self-managed hardware-neutral data center automation platform for provisioning and managing Infrastructure as Code (IaC). The DCAW as described herein enables the tasks of an automation workflow (e.g., a linked instruction set) to be executed at different contexts (e.g., execution locations) or including the ability to change contexts dynamically during the execution sequence. This allows operators to create a single automation sequence that starts in one system context, such as within a physical server's operating system, and that automatically transfers execution to another system context, such as a privileged data center manager, and then back again. The context may be switched multiple times between multiple locations. It also enables proxy workflows to exist on systems that cannot provide a local context to directly execute a workflow. A DCAW as described herein can change the location or context dynamically while running the tasks of a workflow, which is advantageous for automation since it avoids manually stopping, transferring, and restarting multiple times to complete the workflow.

Figure 1:
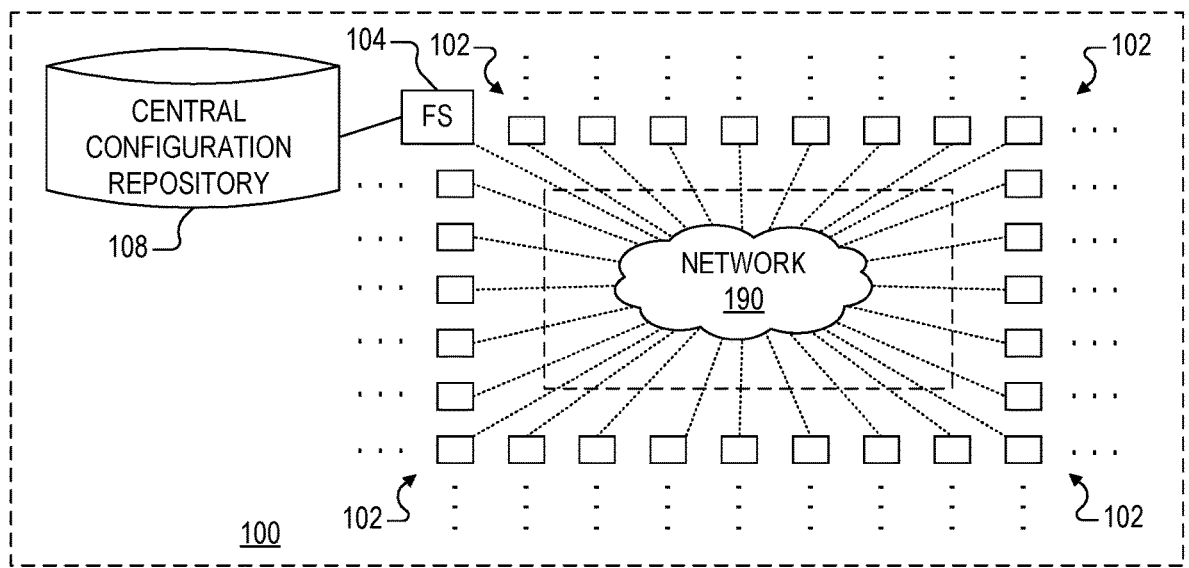
FIG. 1 is a simplified block diagram of a federation including multiple data centers including at least one data center implemented according to one embodiment of the present disclosure.

FIG. 1 is a simplified block diagram of a federation 100 including multiple data centers 102 including at least one data center implemented according to one embodiment of the present disclosure. The federation 100 may include a file server (FS) 104 coupled together via a communication network 190, although the communication network 190 itself is not considered part of the federation 100. The network 190 may include localized portions, such as local area networks (LANs) or the like, but generally also includes a significantly wider portion, such as a regional or global computer network including the internet or the like, which is used for interfacing local and remote data centers 102 and the FS 104. The FS 104 and each of the data centers 102 may be located at any one or more of several different site configurations, such as, for example, a home, an automobile, a ship, a space craft, a cell tower, an office or office building, a retail location, a computer center or building, etc. A dotted line between the network 190 and the FS 104 and between the network 190 and each of the data centers 102 represents an interface to the network 190. Each interface may be tightly or loosely coupled, may be continuous or intermittent, and may include any combination of wireless or wired configurations.

The federation 100 is illustrated to include many data servers 102 in which ellipses generally represent that the federation 100 may include many more data servers than that shown, such as numbering in the hundreds or even thousands or more. It is noted, however, that a system and method of dynamic context workflow automation implemented according to embodiments described herein may be implemented on any one or more of the data centers 102. The FS 104 may also be configured as a data center, but generally operates to enable access by each of the data centers 102 to each other and to a central configuration repository storage 108 coupled to the FS 104.

The federation 100 incorporates distributed edge configuration management which allows operators of highly distributed autonomous edge data center sites to operate both autonomously and under hierarchical federated control. Any one or more up to all of the data centers 102 may operate as an "edge" data center that may be isolated from the network 190 from time to time. Such intermittent connectivity would otherwise isolate edge locations from conventional infrastructure management services. An edge location may have limited network bandwidth or latency, and may have limited physical access. It is noted that limited or intermittent network access is not a prerequisite of distributed edge configuration management as described herein; instead, distributed edge configuration management enables consistent and repeatable management regardless of connectivity status. Many of the data centers 102, for example, may operate with very high bandwidth and low latency most if not all of the time. Data center management should nonetheless be consistent and repeatable across the entire federation 100.

Figure 2:
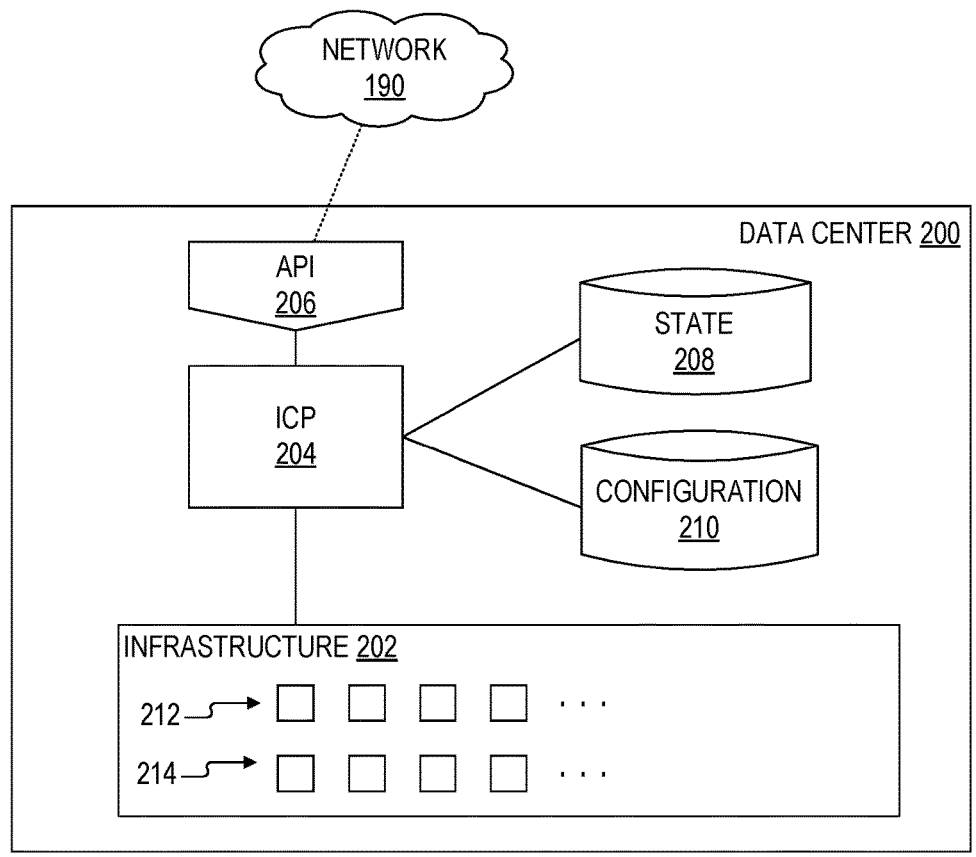
FIG. 2 is a simplified block diagram of a data center implemented according to one embodiment of the present disclosure, in which any one or more up to all of the data centers of FIG. 1 may be implemented in the same or similar manner as the data center of FIG. 2.

FIG. 2 is a simplified block diagram of a data center 200 implemented according to one embodiment of the present disclosure, in which any one or more up to all of the data centers 102 of FIG. 1 may be implemented in the same or similar manner as the data center 200. The data center 200 includes a local infrastructure 202, an infrastructure configuration platform (ICP) 204 (which may also be referred to as an "endpoint"), an Application Programming Interface (API) 206 for interfacing the network 190, a state storage 208, and a configuration storage 210. Although the storages 208 and 210 are shown separately, they may be combined or be part of a larger system of storages. The storages 208 and 210 may each include any combination of data storage devices, such as disk drives (including magnetic disk drives, solid state drives, optical drives, etc.) used for long term storage of data and information. Although the data center 200 is shown including only one infrastructure 202 and ICP 204, the data center 200 may support multiple infrastructures, ICPs, and storage devices. Each ICP described herein, including the ICP 204, incorporates a configuration processor and other resources for managing a corresponding infrastructure.

The API 206, which is exposed by the ICP 204 to external devices via the network 190, enables communication with external computers and resources including other data centers and the FS 104 and its resources. These external interactions include commands that are requests to change the configuration or state of the infrastructure 202. Requests or commands may be initiated by a user directly or via a Command Line Interface (CLI), by a Web client, or by any other client or user. The interactions may also be initiated by other systems on behalf of a user. Although not explicitly shown for ICPs shown and described herein, it is understood that each ICP includes a corresponding API (similar to the API 206) for enabling communications with other data centers (e.g., any of the other data centers 102), devices, servers, etc., interfaced via the network 190.

The infrastructure 202 incorporates one or more physical and/or virtual machines 212 and other physical and virtual computational resources 214 for performing the functions and services of the data center 200, such as network routers, network switches, firewalls, storage systems (e.g., magnetic, optical or electrical disk drives or storage devices and the like) and other commodity components such as application delivery controllers or the like. The computational resources may include virtual machine applications or the like that may be accessed locally or remotely.

The ICP 204, which is a local service or process or the like, operates as an infrastructure controller to manage the configuration and operating functions of the infrastructure 202. Although the ICP 204 may be located on or otherwise executed by a server of the infrastructure 204, the ICP 204 may also be executed by a separate or even external server or processor to maintain control in the event one or more of the devices of the infrastructure 204 becomes unavailable, such as being shut down or reset or the like.

The state storage 208 stores a description of the state of the infrastructure 202. The state information describes the infrastructure 202 and status of operation, such as specific site identification information, names and identifiers of individual servers, status of operation of the servers, identification and status of applications running (or executing) on the servers, network access information, etc. The state information is dynamic and constantly changing during operation and thus generally comprises read/write (R/W) information.

The configuration storage 210 stores configuration information including instruction sets, such as operational programs, automated code, automated scripts, programs, and applications and the like, which are executed by the ICP 204 for setting up, configuring, and reconfiguring the infrastructure 202 for desired operation. The instruction sets are organized as a hierarchy of tasks for establishing how the infrastructure 202 should respond to stimulus. Examples of configuration information for any one or more of the computer servers of the infrastructure 202 include installed versions of operating programs (OS), application programs, software, etc., the method of accessing or connecting to the network 190, storage layout including storage amount, applicable BIOS version, etc.

Figure 3:
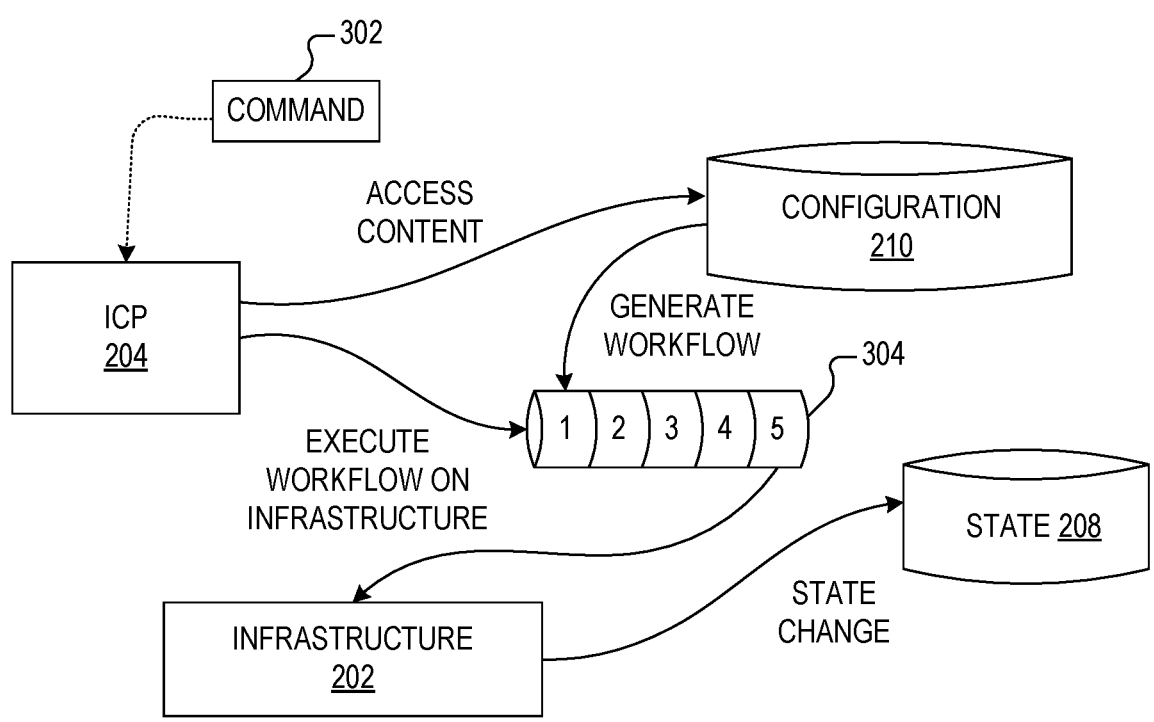
FIG. 3 is a figurative block diagram illustrating an intent-based operation that is performed in response to a request according to one embodiment of the present disclosure.

FIG. 3 is a figurative block diagram illustrating an intent-based operation that is performed in response to a command 302 (a.k.a., "request") according to one embodiment of the present disclosure. The command 302 may be generated locally or provided from the network 190 via the API 206 (not shown in FIG. 3) and received by the ICP 204. It is understood that each ICP instance includes an API or other network interface. The ICP 204 accesses configuration information from the configuration storage 210 and generates a corresponding workflow 304. The ICP 204 coordinates execution of the workflow 304 to effectuate a state change to update the state information stored in the state storage 208. One objective of the ICP 204 is to enable operators to make API requests or the like to achieve a target state with the expectation that the ICP 204 make a series of intermediate state changes in the form of the workflow 304 to effectuate the target state of the infrastructure 202. This operational model is achieved when the ICP 204 accesses and executes an advanced configuration system that includes a wide range of automation, templates and scripts used to advance the infrastructure 202 between states.

The workflow 304 is a sequence of operations or tasks or an automation chain for provisioning a new machine or otherwise updating or managing an existing machine of the infrastructure 202. As shown, the workflow 304 includes 5 sequential tasks numbered 1-5, although a workflow may include any number of tasks less than or greater than 5 tasks. The workflow 304 may be a management function, such as configuration or reconfiguration of a machine, software or operating system installation, enabling or allowing access to other machines or secure locations, adding security credentials, changing name, configuring or modifying underlying hardware to perform a function, etc. Historically a workflow is executed in one place such as by the ICP 204 or the like within the data center.

The tasks or actions of many workflows, however, cannot be done at the same location or by the same process or machine for various reasons, such as a lack of access to another process or system with which there is no access to register, a lack of the correct logic or information, or a lack of security credentials or the like. When provisioning a virtual machine (VM), for example, some configurations or configuration sets must be run locally on the machine, but a new VM does not yet exist. The first step is to create an instance of the VM in the cloud or on another machine or process, and then transfer the context or location to the machine itself for performing the configuration tasks.

As another example, a physical machine (PM) may be booted to provide control to invoke or start an agent on that machine to take some configuration actions. The PM may need, however, network access and the ability to communicate via a networking switch or the like. The PM, however, cannot configure the networking switch for that machine since it cannot configure its own networking access. Networking configuration often requires networking capability which the physical machine initially lacks. Instead, the initial network configuration is performed from a different location or context that has network access to the networking switch, and once established, operation may be transferred back to the PM to complete the network configuration process.

Figure 4:
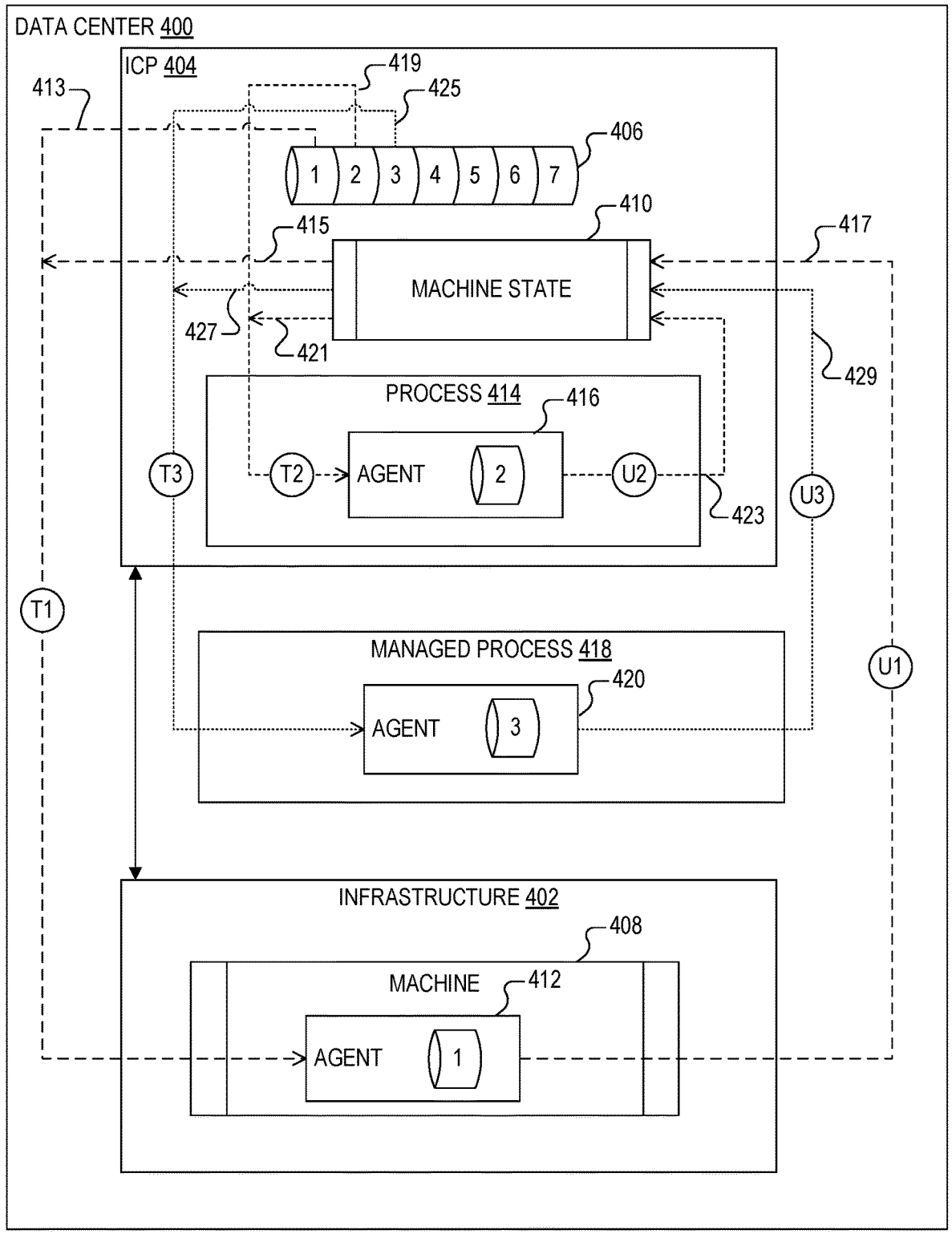
FIG. 4 is a simplified block diagram of a data center including a managed infrastructure and an ICP orchestrating or coordinating execution of a workflow according to one embodiment of the present disclosure.

FIG. 4 is a simplified block diagram of a data center 400 including a managed infrastructure 402 and an ICP 404 orchestrating or coordinating execution of a workflow 406 according to one embodiment of the present disclosure. Although not explicitly shown, it is understood that the ICP 404 may include an API or other network interface and that the data center 400 may include storage for storing configuration information (e.g., configuration storage 210) and state information (e.g., state storage 208). The ICP 404 receives a command or request similar to the command 302, and generates the workflow 406 based on the command using configuration information or the like. The workflow 406 is shown including 7 separate tasks numbered 1, 2, 3, . . . , 7 (1-7) (and individually referenced as task T1, task T2, etc.). It is noted that a workflow may include any number of tasks depending upon the function or operation to be performed.

The workflow 406 is performed or executed on behalf of a machine 408 located within the infrastructure 402. The infrastructure 402 may include any number of physical machines (PMs) and/or virtual machines (VMs). The machine 408 may be a PM, such as a physical computer system or server or the like, or may be a virtual machine configured in software of a computer or server or the like that emulates a physical computer or server. A machine state 410 located within the ICP 404 is an internal representation of the machine 408. The tasks of each workflow, including the workflow 406, are performed one at a time in sequential order. The corresponding current machine state, including the machine state 410, is provided as an input for performing the task causing the machine state to be updated. As further described herein, each task of a workflow is performed by an agent running on an internal or external process, or on the machine itself, to generate updated machine state information, which is then provided back to the ICP orchestrating the workflow to update the local machine state.

As shown in FIG. 4, the machine 408 locally executes an agent 412 for executing one or more of the tasks of the workflow 406. The ICP 404 access the first task of the workflow 406, or task T1, and determines that task T1 may be executed or otherwise performed by the agent 412 running on the machine 408 as the appropriate context for task T1. The ICP 404 notifies or otherwise activates the agent 408 and provides information regarding task T1 or may transfer a copy of task T1 to the agent 412. The agent 412 receives or otherwise retrieves task T1 as indicated by line 413, retrieves or otherwise gains access to the machine state 410 as indicated by line 415, executes T1, and generates corresponding machine state update information U1. Since the agent 412 works under the supervision of the ICP 404, operations on the machine 408 are mapped to the machine state 410 and instructions for the task T1 performed by the agent 412 are determined by the original task T1 of the workflow 406 of the ICP 404. The agent 412 transfers the machine state update information U1 back to the ICP 404 as indicated by line 417, where the ICP 404 uses U1 to update the machine state 410 accordingly.

In one embodiment the agent 412 may already exist on the machine 408 in which case it may be suspended until activated by the ICP 404. Once activated and running, the agent 412 may include a complete instruction set for performing task T1. Alternatively, if the agent 412 does not include the instruction set or has an incomplete instruction set, then the instruction set may be conveyed to the agent 412 by the ICP 404. In another embodiment, the agent 412 may not yet exist on the machine 408, in which case the ICP 404 may first install the agent 412 on the machine 408 for executing task T1. After the task T1 is executed and the machine state update information U1 is transferred to the ICP 404, the agent 412 may be suspended, terminated or otherwise deleted.

Depending upon the workflow, all of the tasks 1-7 may be performed on the machine 408. It is noted, however, that some tasks of the workflow 406 may be performed by a different context at a different location. As shown, the ICP 404 may incorporate (or generate) a dedicated process 414 including an agent 416. Operation is substantially similar. The ICP 404 accesses the second task T2 of the workflow 406 and determines that task T2 is to be executed or otherwise performed by the agent 416 executed within the process 414. The ICP 404 notifies or activates the agent 416 or otherwise installs the agent 416 and provides information regarding task T2 or actually transfers a copy of task T2 to the agent 416. The agent 416 receives or otherwise retrieves task T2 as indicated by line 419, retrieves or gains access to the machine state 410 as indicated by line 421, executes T2, and generates corresponding machine state update information U2. The agent 416 transfers the machine state update information U2 back to the ICP 404 as indicated by line 423, which uses U2 to update the machine state 410 accordingly.

The process 414 including corresponding agent 416 is an example of an endpoint context. This type of context is useful when the item to be controlled, such as the machine 408, cannot run the agent to create a local context. Devices such as network switches, storage arrays, data center appliances and black-box systems are not able to run a local agent and desire implementing the type of external context shown as the process 414 of the ICP 404.

A managed process 418 and corresponding agent 420 illustrates a variation of processes running within the ICP 404, in which case the managed process 418 instead runs completely outside of the management of the ICP 404. Operation is similar in which the ICP 404 accesses the third task T3 of the workflow 406 and determines that task T3 is to be executed or otherwise performed by an agent of the managed process 418. The ICP 404 uses (or installs) the agent 420 of the managed process 418, which receives or accesses the third task T3 and the machine state 410 as illustrated by lines 425 and 427. Once executed, the agent 420 generates corresponding machine state update information U3, which is transferred to the ICP 404 as indicated by line 429 for updating the machine state 410. Since the agent 420 handles interactions with the ICP 404 including the execution of the third task T3, the actual system managing the processes can be moved outside direct control of the ICP 404.

There are many possible implementations for how the ICP 404 can manage the process 418. This may include directly starting a thread, executing a new process on the host of the ICP 404 (not shown), starting a container with the agent 420, or delegating to a process management system such as Kubernetes. Kubernetes, for example, is an open-source container-orchestration system for automating computer application deployment, scaling, and management. All of these implements are reasonable alternatives depending on the specification of the system and the degree of isolation desired.

Several methods are contemplated for determining the context for executing each task of a workflow. In a first embodiment, each task specifically identifies the particular context and/or agent to execute that task. The task may include an identifier and may also include any access information necessary for the agent or context. In a second embodiment, each task identifies the requirements and/or parameters necessary for performing that task, such as processing capabilities, equipment access, security access, etc., and the ICP selects a context and corresponding agent that meets the specified requirements and/or parameters. Selection may be based on availability or the like. In a third embodiment, the ICP evaluates the task and determines the requirements and/or parameters needed for the task and selects the corresponding context and corresponding agent.

FIG. 4 illustrates how a workflow, such as the workflow 406, can be executed on different contexts (or processing locations) as orchestrated by the ICP 404. The machine 408, the process 414, and the managed process 418 are different contexts or locations of the data center 400. The particular ordering of the different contexts for executing the tasks of the workflow 406 shown in FIG. 4 is shown only for purposes of illustration and may be reordered or rearranged depending upon the appropriate context for performing particular tasks. For example, if the workflow 406 is instead a provisioning workflow for creating the machine 408 within the infrastructure 402, then the first task T1 cannot be performed on the machine 408 since it does not yet exist. In that case, the ICP 404 may first generate the machine state 410 as a placeholder, and then determine the identified or appropriate context, such as the process 414 or the managed process 418 or other contexts as further described herein, for performing task T1 and other sequential provisioning tasks of the workflow 406. The first set of tasks of the workflow 406, for example, may be provisioning tasks that create and provision the machine 408 with corresponding updates to the machine state 410. Once provisioned, the machine 408 may ultimately be used to run an agent, such as the agent 412, to perform latter tasks of the workflow 406 or tasks of other workflows (not shown).

The processes 414 and/or 418 may be provisioned on the fly by the ICP 404 for purposes of executing certain tasks of the workflow 406 or other workflows as they arise. Once the corresponding agents are installed and used to perform one or more of the tasks of a workflow, they may be suspended for later use, or even deleted to free up processing resources. A local context can be desired for many reasons including access to local resources such as hard drives, network interfaces, firmware, encryption information or other resources. The ability to change contexts for executing the tasks of a workflow allows operators to design a single automation process with different resources access contexts.

It is noted that each task of a workflow can perform changes to the machine itself, just to the machine state, or both. A task may also perform one or more functions on the machine's behalf, which ultimately result in updates to the machine state. In some cases tasks may occur out of sync and have to be caught up in sequential order. For example, an ICP (e.g., ICP 404) could take a series of tasks and corresponding actions on behalf of a machine to a cloud system (say create a machine or the like) that do not initially impact a machine or its state. Later in the sequence, a follow-up task is used to update the machine and the corresponding machine state. Even later, that information could be used to update the machine's own configuration. At least one purpose of a system and method of dynamic workflow automation as described herein is not necessarily to require immediate synchronization but to provide a system and method in which actions can be taken in different contexts that can ultimately be rationalized over time.

Figure 5:
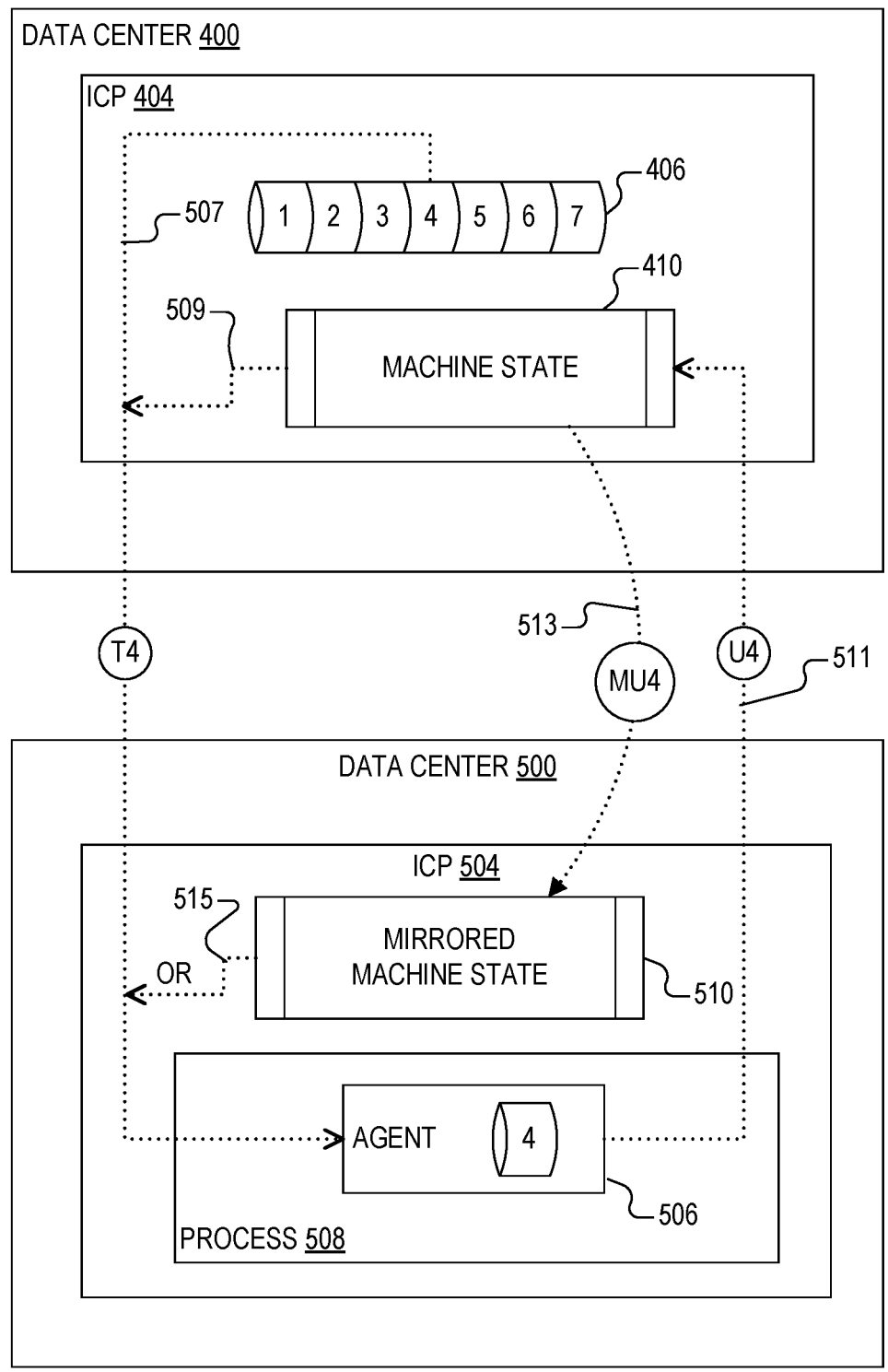
FIG. 5 is a simplified block diagram of multi-context scenario between the data center of FIG. 4 and another data center of the federation of FIG. 1 according to one embodiment of the present disclosure.

FIG. 5 is a simplified block diagram of multi-context scenario between the data center 400 and another data center 500 of the federation 100 according to one embodiment of the present disclosure. The data centers 400 and 500 are shown in simplified form in which the data center 400 includes the ICP 404 and the data center 500 includes an ICP 504 in similar manner. Although not explicitly shown in FIG. 5, each of the data centers 400 and 500 include corresponding infrastructures and storage and APIs. As described in FIG. 4, the ICP 404 orchestrates or coordinates execution of the workflow 406 including a fourth task T4. The context mapping of the workflow 406 may include or refer to other ICPs in the same or other data centers of the federation 100, such as the ICP 504 of the data center 500. The ICP 404 identifies or otherwise determines that the task T4 of the workflow 406 may or should be executed or otherwise performed by an agent 506 running in an internal process 508 of the ICP 504.

In a substantially similar manner as previously described, the ICP 404 notifies or otherwise activates the agent 506 and provides information regarding task T4 or may transfer a copy of task T4 to the agent 506 for execution. The agent 506 receives or otherwise retrieves task T4 as indicated by line 507, retrieves or otherwise gains access to the machine state 410 as indicated by line 509, executes the task T4, and generates corresponding machine state update information U4. The agent 506 transfers the machine state update information U4 back to the ICP 404 as indicated by line 511, in which the ICP 404 uses U4 to update the machine state 410 accordingly for the machine 408 shown in FIG. 4. It is noted that process 508 may initially either not exist or not be running, in which case the ICP 504 creates it or activates it in response to communication from the ICP 404. Also, the ICP 404 or the ICP 504 may install or activate the agent 506 for executing task T4. Once task T4 is executed and the machine state update information U4 generated and transferred, the process 508 and/or the agent 506 may be suspended and/or terminated or deleted depending upon the needs of the ICP 504 at the time.

In one embodiment, the ICP 504 may perform a management function of the machine 408 in which it keeps and maintains a local mirrored copy of the machine state 410, shown as mirrored machine state 510. The ICP may not be authorized to directly update the mirrored machine state 510 since updates are controlled by the ICP 404. Instead, once the machine state 410 is updated, mirrored update information MU4 is transferred from the ICP 404 to the ICP 504 as shown by line 513 for updating the mirrored machine state 510. As an alternative, when the task T4 is transferred to the agent 506 for execution, the agent 506 may instead access the local mirrored machine state 510 as indicated by line 515 rather than accessing the remotely located machine state 410. In other words, as long as the mirrored machine state 510 is up to date and reflects the current state of the machine state 410, it may be used by the agent 506 rather than having to access the remotely located machine state 410.

There are many potential benefits to moving contexts between ICP endpoints of a given federation, such as the federation 100, as shown in FIG. 5. For example, two ICP endpoints could be constructed as a high availability (HA) pair so that workflow contexts can be maintained in the event of a failure. Similar peered ICP contexts could be used for load balancing to offload processes from a single ICP. Allowing workflow contexts in hierarchical configurations may be desired in secure or access restricted environments. For example, an ICP of a data center may not be able to take action against APIs available at the core such as network link provisioning or access control operations. In these cases, using a core ICP in a workflow uses context in locations where access is allowed. In the case of a remote site (e.g., data center) being installed, the local ICP could setup the local systems and delegate to a centralized ICP to enable networking, create user accounts and complete tickets that are only available at the central control site.

Figure 6:
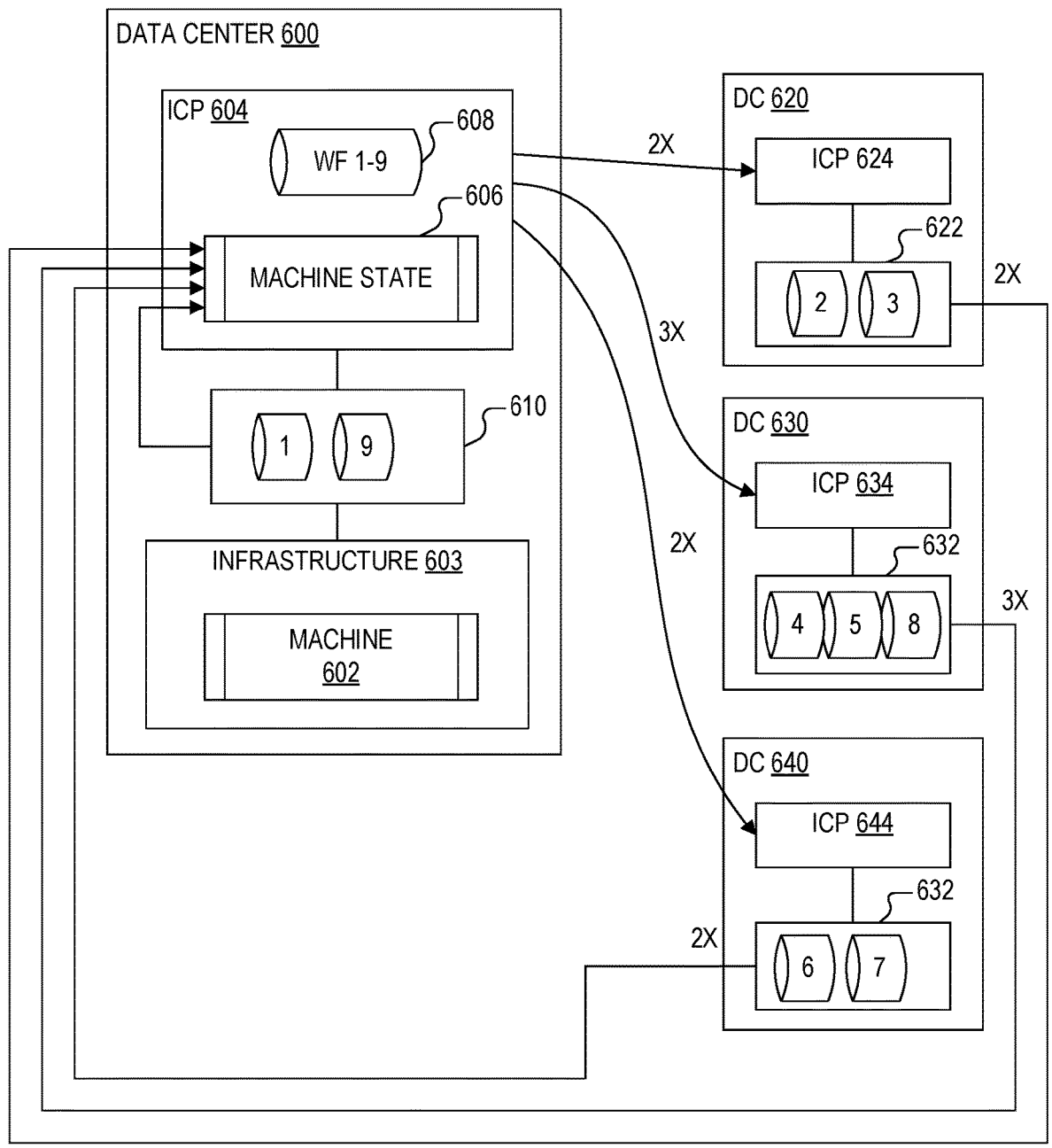
FIG. 6 is a simplified block diagram of another multi-context scenario between multiple data centers of the federation of FIG. 1 according to one embodiment of the present disclosure.

FIG. 6 is a simplified block diagram of another multi-context scenario between multiple data centers 600, 620, 630, and 640 of the federation 100 according to one embodiment of the present disclosure. The data center (DC) 600 includes an ICP 604 for managing machines of an infrastructure 603 including a machine 602 (virtual or physical). A machine state 606 located within the ICP 604 is an internal representation of the machine 602. The ICP 600 generates and orchestrates execution of a workflow (WF) 608 shown including 9 tasks 1-9. The data center 600 is also shown including an agent 610 for executing one or more of the tasks of the workflow 608. The agent 610 may be running in any of the contexts of the data center 600 in a similar manner as described for the data center 400, such as running on the machine 602 (e.g., similar to the agent 412 running on the machine 408), or running on a process within the ICP 604 (e.g., similar to the agent 416 running within the process 414), or running on a process external to the ICP 604 (e.g., similar to the agent 420 running within the process 418). Although only one agent 610 is shown for the data center 600, it is understood that any number of agents running by or within corresponding local contexts of the ICP 604 is contemplated.

The first task T1 of the workflow 608 is executed by the agent 610, and the machine state 606 is correspondingly updated. The next two tasks T2 and T3 are executed by an agent 622 of the data center 620 managed by an ICP 624. The ICP 604 sequentially contacts the ICP 624 two times (2X) for the two tasks T2 and T3 resulting in two (2X) sequential updates of the machine state 606. Similarly, the next two tasks T4 and T5 are executed by an agent 632 of the data center 630 managed by an ICP 634. The ICP 604 sequentially contacts the ICP 634 two times for the two tasks T4 and T5 resulting in two sequential updates of the machine state 606. Similarly, the next two tasks T6 and T7 are executed by an agent 642 of the data center 640 managed by an ICP 644. The ICP 604 sequentially contacts the ICP 644 two times for the two tasks T6 and T7 resulting in two sequential updates of the machine state 606. The next task T8 is shown executed by the agent 632 of the data center 630. The ICP 604 contacts the ICP 634 again for the task T8 resulting in another update of the machine state 606. It is noted that the ICP 634 is contacted a total of three times (3X) for tasks T4, T5, and T8, resulting in a total of three updates (3X) of the machine state 606, although not in sequential order. Finally, the last task T9 of the workflow 608 is executed by the agent 610, and the machine state 606 is correspondingly updated to complete the workflow 608.

The multi-context scenario shown in the block diagram of FIG. 6 exemplifies even further the flexibility of a system and method of dynamic context workflow automation according to embodiments of the present disclosure for moving contexts between multiple ICP endpoints of a given federation, such as the federation 100. The particular ordering illustrated is arbitrary and may be modified in any suitable manner depending upon the needs of each of the tasks of a given workflow. Although the machine 602 is shown as an actual machine of the data center 600, one or more up to all of the tasks of the workflow 608 (depending upon the purpose of the workflow 608) may even be executed to update the machine state 606 for a machine that does not yet exist. The illustration shown in FIG. 6 may be expanded to a multiple data center network configuration that may require actions on both ends of the connection rather than at only one data center, such as, for example, coordinating activity between multiple data centers.

Figure 7:
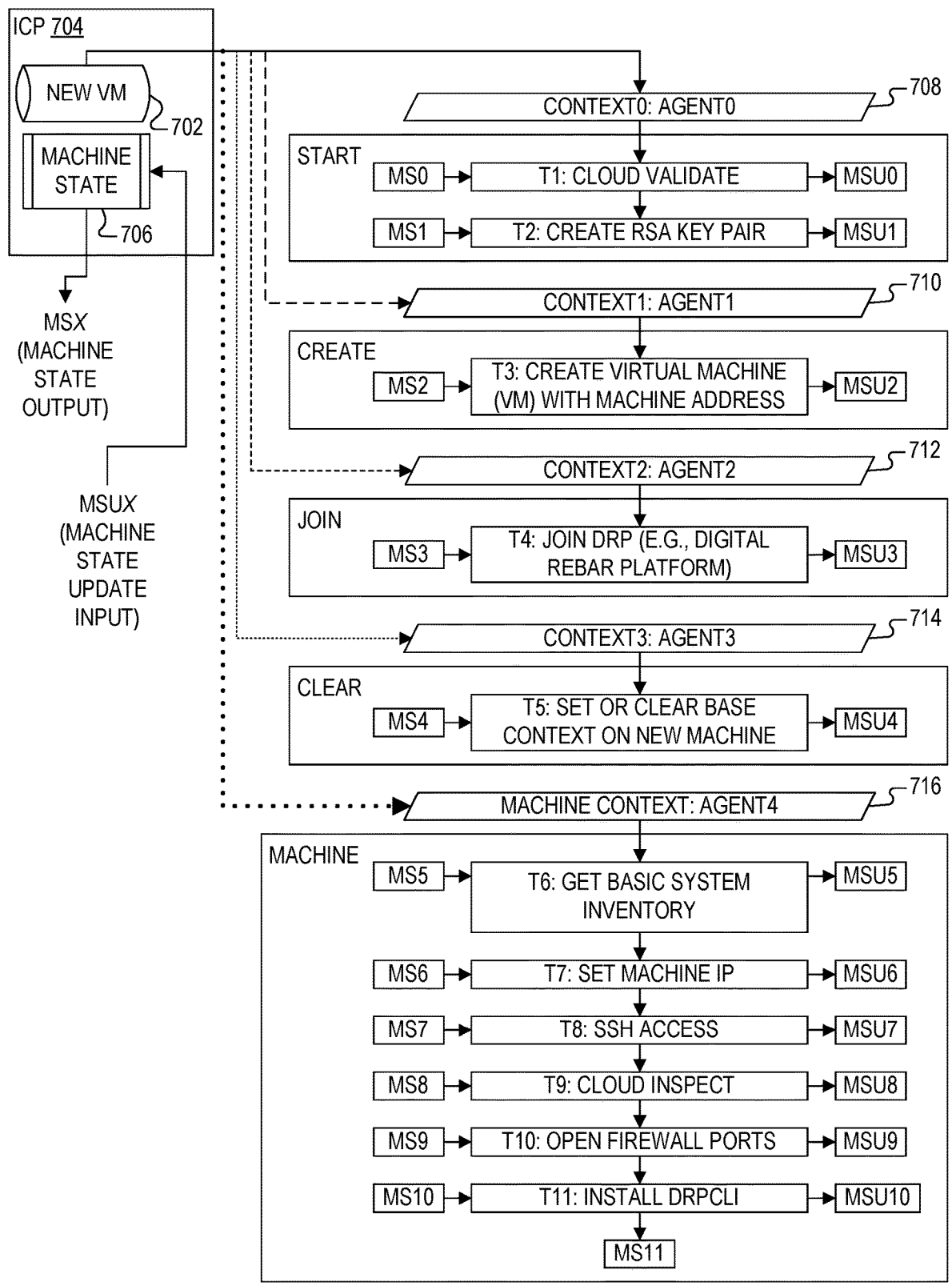
FIG. 7 is a simplified block diagram illustrating operation of a cloud provisioning workflow for creating a new VM according to one embodiment of the present disclosure using several contexts operating in concert.

FIG. 7 is a simplified block diagram illustrating operation of a cloud provisioning workflow 702 for creating a new VM (not shown) according to one embodiment of the present disclosure using several contexts operating in concert. The workflow 702 is created by an ICP 704 of a data center (not shown). The VM does not yet exist so the ICP 704 first creates a machine state 706 as a placeholder for the new VM. During execution of the workflow 702, the ICP 704 orchestrates the workflow 702 by examining each task, determining the context for the task (either identified in the task, specified in the task, or determined based on the task), contacting the identified or determined context and/or the corresponding agent or otherwise installing or commanding installation of the agent, transferring the task or otherwise providing information to the agent for accessing the task and the machine state 706, and updating the machine state 706 upon receiving the machine state update information from the agent that executed the task. The current state of the machine state 706 is output as MSX in which X denotes an index for each sequential state, and the machine update information is received as a corresponding input MSUX to update the machine state 706. As previously described, each context is a process running locally on the data center of the ICP 704, a process running on another data center, or ultimately on the created machine itself depending upon the tasks to be performed.

A first context CONTEXT0 for running an agent AGENT0 shown at 708 is used to execute the first two tasks T1 and T2 for performing a first START stage of the workflow 702. The context is changed to CONTEXT0 and AGENT0 is accessed to run the tasks T1 and T2 for the START stage. The first task T1 is a cloud validate task that is executed by AGENT0 to ensure that minimum values are set for cloud wrappers as understood by those of ordinary skill in the art. Cloud provisioning, for example is the allocation of a cloud provider's resources and services to a customer. Cloud provisioning may include, for example, infrastructure as a service, software as a service and platform as a service, in public or private cloud environments. An example of a cloud provisioning application is known as "Runner." AGENT0 receives task T1 and an initial state MS0 of the machine state 706, executes the cloud validate task T1, and outputs machine state update information MSU0. When updated, the machine state 706 is updated to a state MS1. The second task T2 is an RSA (Rivest, Shamir, & Adleman) key pair creation task which is a public key encryption technology used to create an RSA key pair for encrypting and decrypting shared information. AGENT0 receives task T2 and the current state MS1 of the machine state 706, executes the RSA key pair task T2, and outputs machine state update information MSU1. When updated, the machine state 706 is updated to a state MS2.

A second context CONTEXT1 for running an agent AGENT1 shown at 710 is used to execute a third task T3 for performing a second CREATE stage of the workflow 702. The context is changed to CONTEXT1 and AGENT1 is accessed to run the task T3 for the CREATE stage. The third task T3 creates the VM with a corresponding machine address. An example of a VM creation application is known as "Terraform" by HashiCorp which is a tool for building, changing, and versioning infrastructure. AGENT1 receives task T3 and the current state MS2 of the machine state 706, executes the VM creation task T3, and outputs machine state update information MSU2. When updated, the machine state 706 is updated to a state MS3.

A third context CONTEXT2 for running an agent AGENT2 shown at 712 is used to execute a fourth task T4 for performing a third JOIN stage of the workflow 702. The context is changed to CONTEXT2 and AGENT2 is accessed to run the task T4 for the JOIN stage. The fourth task T4 joins the VM to a digital rebar platform (DRP). An example of a join up application is known as "Ansible" which is an open-source automation tool, or platform, used for IT tasks such as configuration management, application deployment, intra-service orchestration, and provisioning. AGENT2 receives task T4 and the current state MS3 of the machine state 706, executes the join up task T4, and outputs machine state update information MSU3. When updated, the machine state 706 is updated to a state MS4.

A fourth context CONTEXT3 for running an agent AGENT3 shown at 714 is used to execute a fifth task T5 for performing a fourth CLEAR stage of the workflow 702. The context is changed to CONTEXT3 and AGENT3 is accessed to run the task T5 for the CLEAR stage. The fifth task T5 sets or clears the base context of the VM for subsequent discovery. AGENT3 receives task T5 and the current state MS4 of the machine state 706, executes the clear-set task T5, and outputs machine state update information MSU4. When updated, the machine state 706 is updated to a state MS5.

A fifth and final context is the MACHINE CONTEXT shown at 716 which is the VM itself for performing remaining tasks T6, T7, T8, T9, T10 and T11. The context is changed to the MACHINE context and AGENT4 is installed on the VM and accessed to run the tasks T6-T11 for the MACHINE stage. Tasks T6-T8 may be classified as a discovery stage used to inventor and baseline joined machines. Task T6 is used to get basic system inventory for the VM, such as Gohai, which receives machine state MS5 and outputs machine state update information MSU5 for updating the machine state to MS6. Task T7 is a set machine IP task for reading and saving a machine IP address for the VM. Task T7 receives machine state MS6 and outputs machine state update information MSU6 for updating the machine state to MS7. Task T8 is an SSH (secure shell) access task for operating network services securely over an unsecured network. Task T8 receives machine state MS7, puts root SSH keys in place, and outputs machine state update information MSU7 for updating the machine state to MS8. Task T9 is a cloud inspect task that dynamically determines if the VM is in AWS (Amazon Web Services) and records metadata. The cloud inspect task T9 receives machine state MS8, discovers cloud metadata of a node automatically, and outputs machine state update information MSU8 for updating the machine state to MS9. Task T10 is an open firewall ports task that configures firewall ports for the VM. Task T10 receives machine state MS9, opens ports in firewall, and outputs machine state update information MSU9 for updating the machine state to MS10. Task T11 is an install DRPCLI (digital rebar provision command line interface) task that installs the DRPCLI job processor as a service. Task T11 receives machine state MS10, installs the DRPCLI task runner as a service on start up, and outputs machine state update information MSU10 for updating the machine state to a machine state MS11. Although not shown, a final stage or task may represent workflow completion.

It is noted that there is not necessarily a 1:1 correspondence between stages and contexts. A context may include one or more agents for executing the tasks of multiple stages of a workflow, in which the stages of a given context may be sequential or non-sequential. In addition, a stage may span multiple contexts in particular embodiments.

Figure 8:
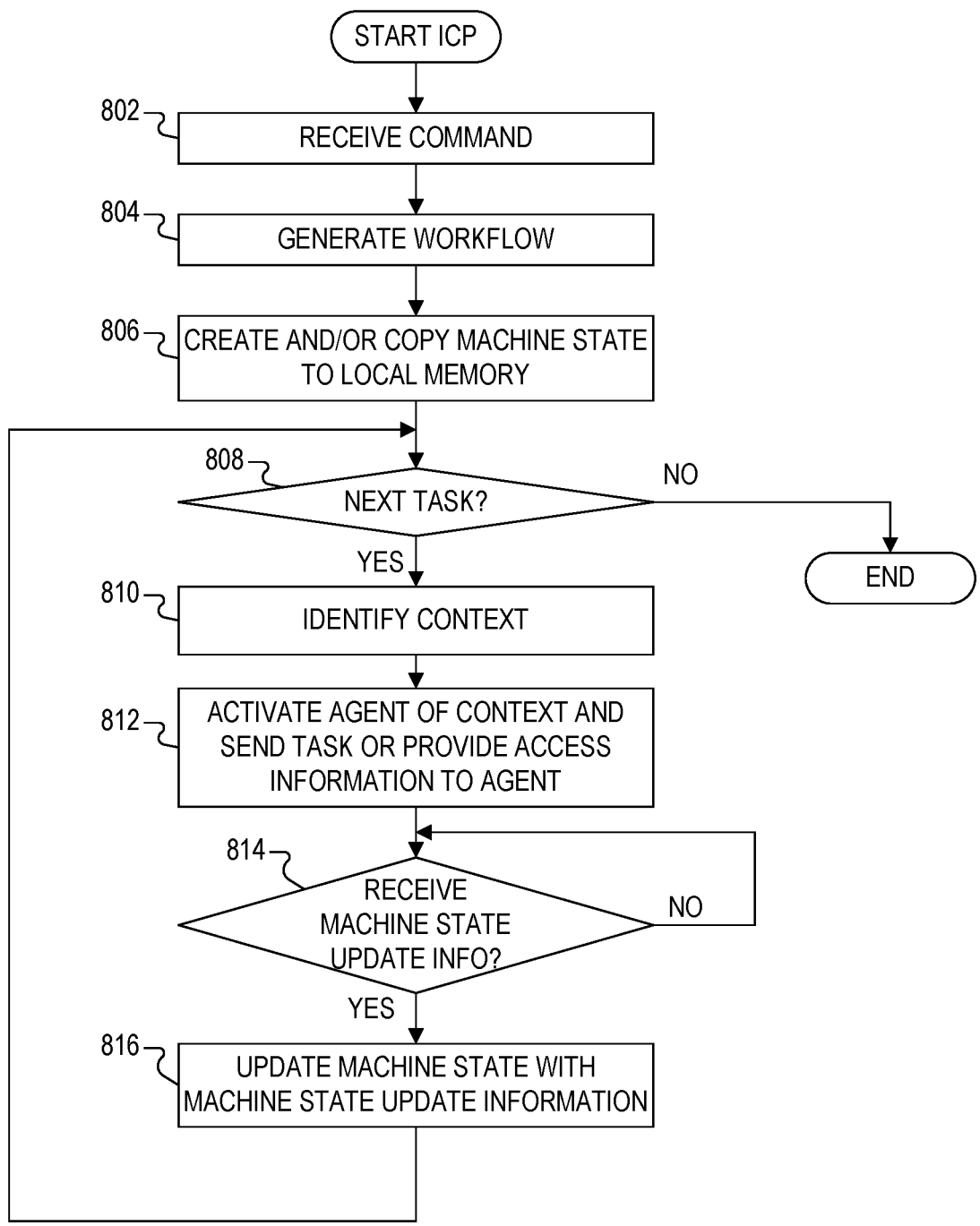
FIG. 8 is a flowchart diagram illustrating operation of an ICP for generating and orchestrating execution of a workflow according to one embodiment of the present disclosure.

FIG. 8 is a flowchart diagram illustrating operation of an ICP, such as any of the ICPs 204, 404, 504, 604, 704, etc., for generating and orchestrating execution of a workflow according to one embodiment of the present disclosure. A command, such as the command 302 previously described, is received by the ICP at block 802 for performing a workflow or sequence of operations on behalf of a machine. At next block 804, the ICP accesses configuration information and generates a corresponding workflow similar to that previously described. At next block 806, the ICP creates or otherwise copies a machine state of the machine to local memory, meaning readily accessible by the ICP (e.g., such as the machine state 410 of FIG. 4). The machine may or may not exist and may be a VM or a PM. An existing physical machine is booted and its machine state is copied. The machine state of an existing VM may simply be copied. If the machine does not yet exist, then the ICP generates a default or minimal machine state as a placeholder for the new machine to be provisioned.

At next block 808, it is queried whether there is another task in the workflow. Assuming the workflow includes at least one task, operation advances to block 810 in which the first or next task is evaluated to determine the context for executing the task. As previously described, the context may be specifically identified within the task, or the requirements and other parameters necessary for performing the task may be specified, or the ICP evaluates the task to determine the appropriate context for performing the task. At next block 812, an agent of the context is activated and the task is either sent to the agent or the agent is provided access to the agent (e.g., provided access information). If the agent does not already exist on a process of the context, then an appropriate agent for performing the task is installed. A suspended agent may simply be activated. Operation of the ICP loops at next block 814 waiting for the activated agent to send machine state update information. When the updated state machine information is received, operation advances to block 816 in which the ICP updates the machine state with the machine state update information, and then operation loops back to block 808 to query whether there is another task in the workflow. Operation loops between blocks 808 to 816 for each task until the last task is completed, and then operation terminates for the current workflow.

Figure 9:
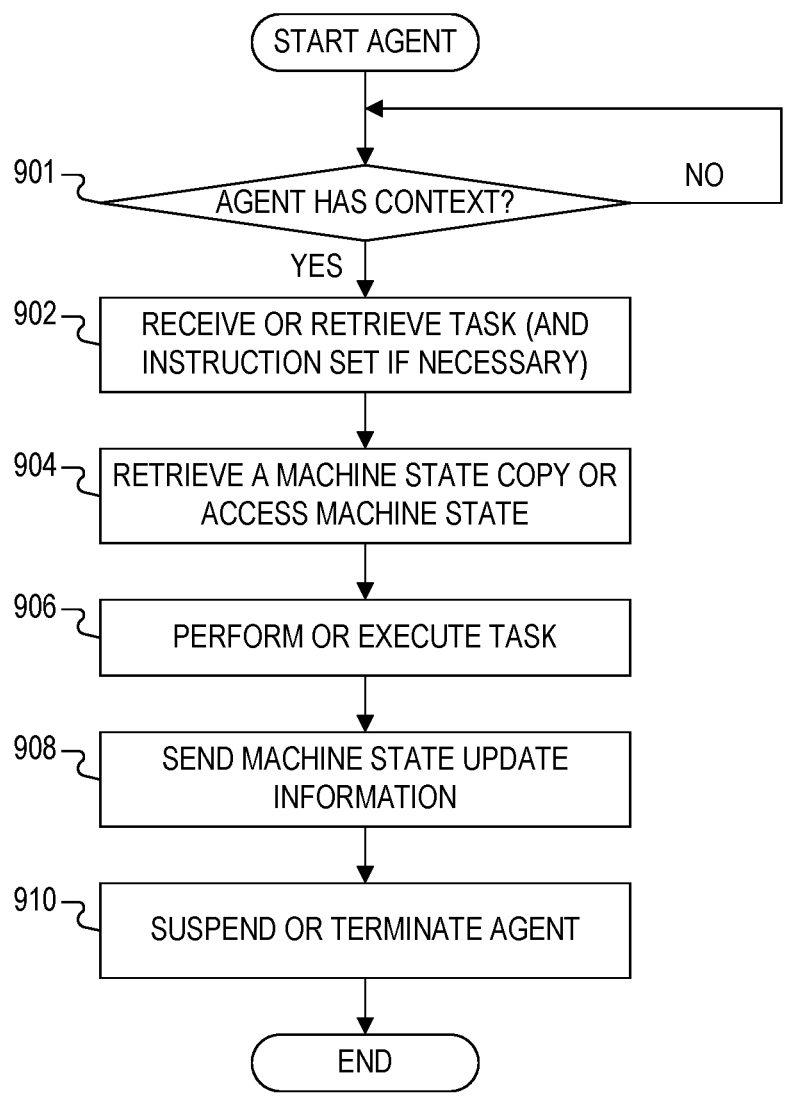
FIG. 9 is a flowchart diagram illustrating operation of an agent activated by an ICP for executing a task of a workflow according to one embodiment of the present disclosure.

FIG. 9 is a flowchart diagram illustrating operation of an agent activated by an ICP for executing a task of a workflow according to one embodiment of the present disclosure. At first block 901, it is queried whether the agent has context, meaning whether the ICP invoking the agent has actually activated the agent or transferred execution control to the agent. If not, operation loops at block 901 until the agent has context. Once the agent has context, operation advances to next block 902 in which the activated agent either receives or retrieves the task from the ICP. The agent may also request and receive an instruction set from the ICP if not already available. At next block 904, the agent either retrieves a copy of the machine state or is otherwise provided access to the machine state as an input for the task. At next block 906, the agent performs or executes the task on behalf of the machined. At next block 908, the agent sends the corresponding machine state update information to the ICP orchestrating the workflow. At next block 910, the agent is either suspended or terminated and operation is completed.

Figure 10:
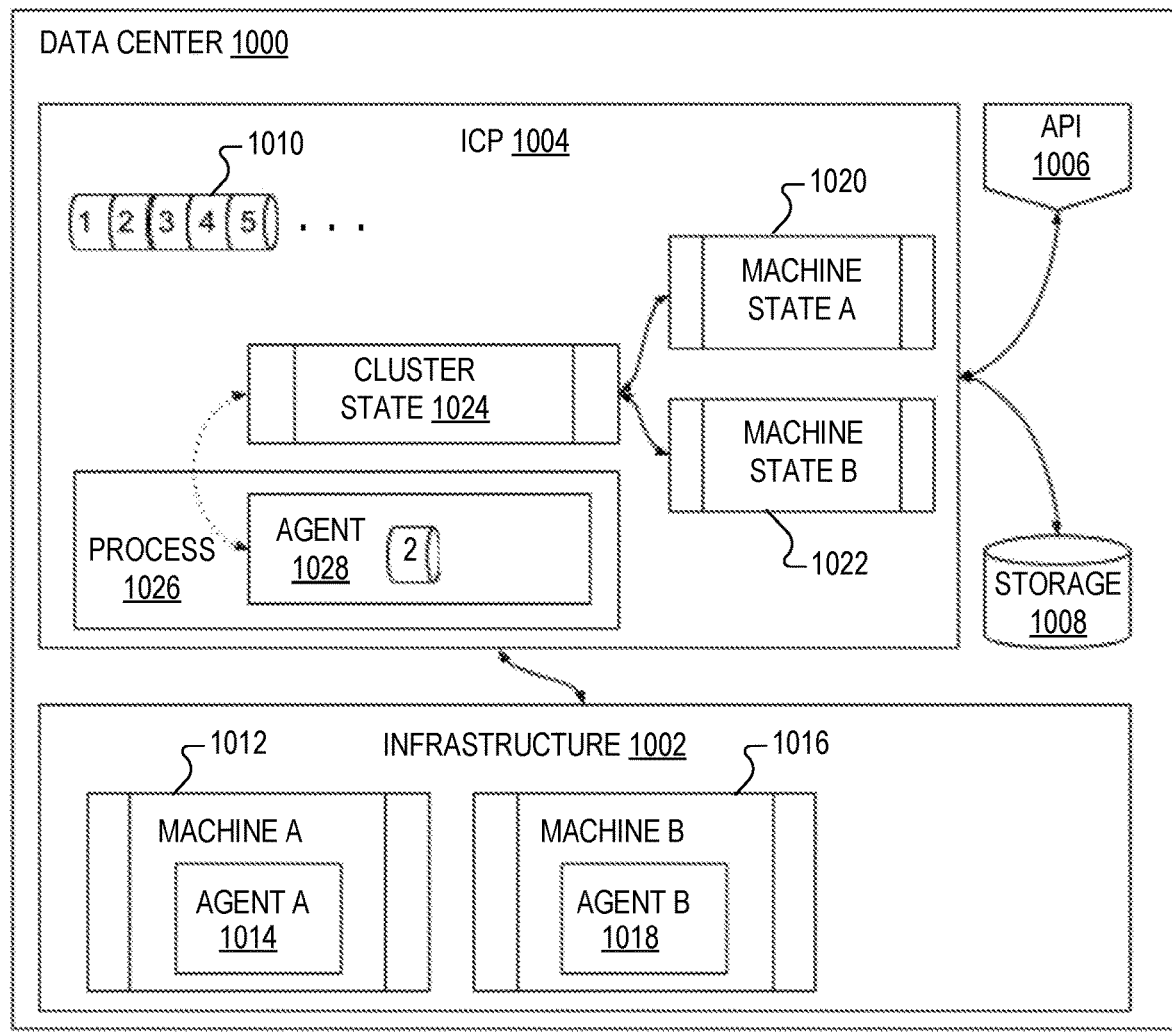
FIG. 10 is a simplified block diagram of a data center including an ICP managing a cluster state implemented according to one embodiment of the present disclosure.

FIG. 10 is a simplified block diagram of a data center 1000 including an ICP 1004 maintaining a cluster state 1024 implemented according to another embodiment of the present disclosure. The data center 1000 includes a local infrastructure 1002, the ICP 1004, an API 1006 for interfacing the network 190, and a storage 1008 for storing both state and configuration information. The ICP 1004 generates and manages execution of a workflow 1010 including any number of tasks for performing any suitable function or operation. The infrastructure 1002 includes multiple VM and/or PM machines including a first machine A 1012 which may run an agent A 1014 and a second machine B 1016 which may run an agent B 1018 for performing workflow tasks. The ICP 1004 maintains a machine state A 1020 representing the machine A 1012 and a machine state B 1022 representing the machine B 1016.

The ICP 1004 further maintains the cluster state 1024. The cluster state 1024, unlike the machine states A and B, is a conceptual model that does not have a direct mapping to a VM or a PM. Nonetheless, the cluster state 1024 includes references to the machine states A and B which are considered part of the same cluster of machines. The cluster state 1024 may have both independent state and dependent state managed as references to other items including the machine states A and B. This independent state allows the lifecycle of the conceptual model to be managed as a stand-alone item. While this illustration illustrates the cluster state 1024 as an example of a conceptual model without a physical implementation, there are many potential uses for conceptual models. Other examples of items that could be defined using conceptual models include software defined storage, software defined networking, racks, data center environmental controls, etc.

The cluster state 1024 may exist as a data set of a cluster of machines, such as including the machines A and B. The cluster state 1024 includes information that is shared among the machines of the same cluster. The cluster state 1024 may provide a means of performing operations of each of the machines in the cluster, such as an upgrade or the like of each of the machines. The cluster state 1024 does not have any physical machine to run a local context. Instead, as shown, the cluster state 1024 may have its own process space, such as process 1026, for performing a workflow on behalf of the machines in the cluster, such as machines A and B. As shown, the process 1026 runs an agent 1028 for performing one or more tasks, e.g., task T2, of the workflow 1010.

While running the workflow 1010 for the cluster state 1024, the agent 1028 executes task T2 in its context with full access to the cluster state 1024. Since the machine states A and B are referenced by the cluster state 1024, the workflow 1010 be able to reference these other machine states to coordinate activity between the corresponding machines A and B. This independent coordination is especially powerful to enable distributed actions beyond the context of a single model.

For example, a cluster workflow context could be used to install a multi-machine platform such as VMware vCenter, Hadoop or Kubernetes. The cluster context is able to manage cluster level actions such as creating security tokens, controlling machine join/remove, and installing applications at the platform level. These are examples of operations that are difficult to perform from a machine context because they may use a multi-machine context. This type of multi-component machine abstraction is a common objective for data center management. The same embodiment could be applied outside of data center contexts were a multi-component action is desired for automation. For example, managing IoT devices in a traffic intersection are just a few applications for this embodiment outside of data center operations.

Figure 11:
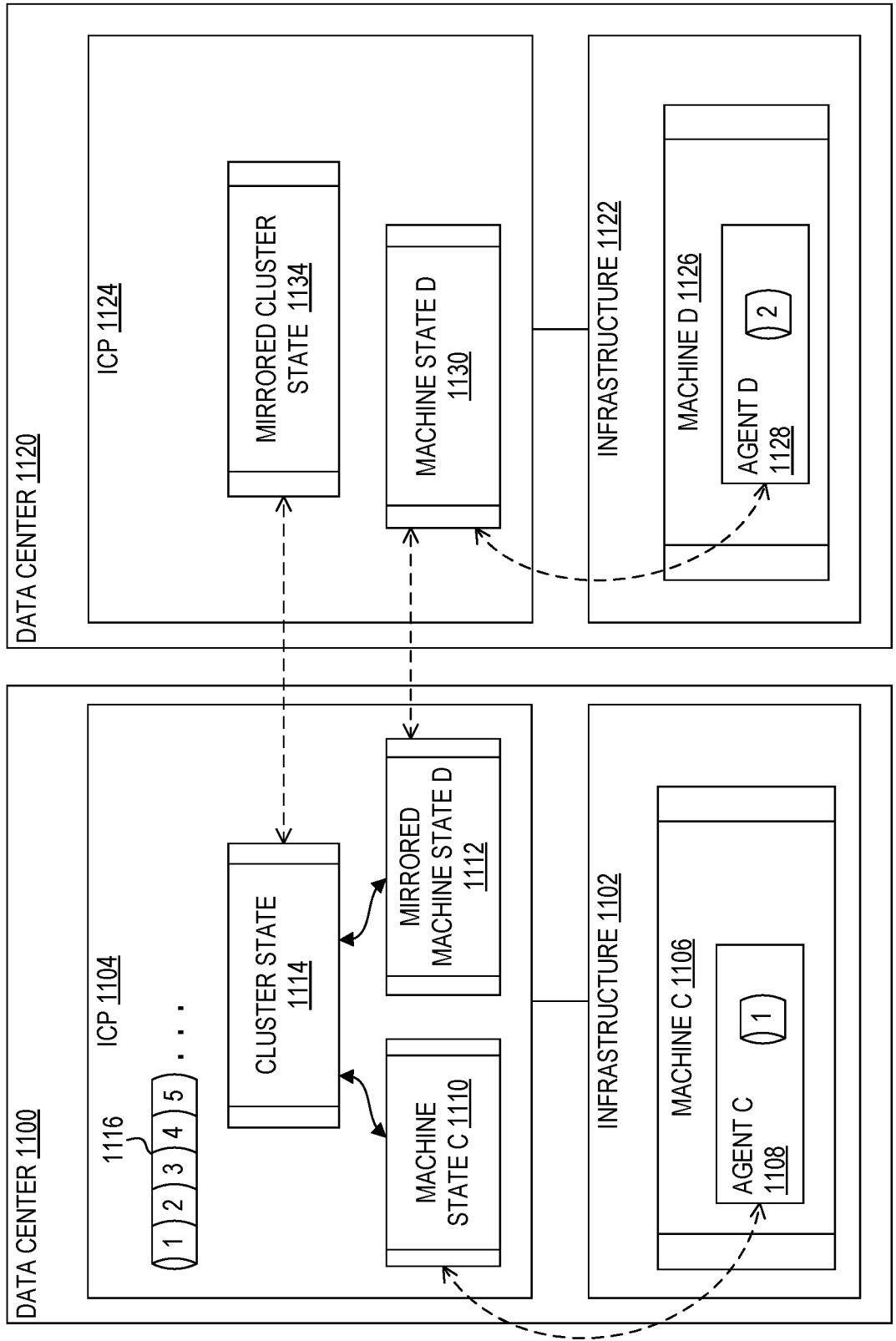
FIG. 11 is a simplified block diagram of a data center including an ICP maintaining a cluster state that includes machines that span multiple data centers according to another embodiment of the present disclosure.

FIG. 11 is a simplified block diagram of a data center 1100 including an ICP 1104 maintaining a cluster state 1114 that includes machines that span multiple data centers according to another embodiment of the present disclosure. The data center 1100 includes a local infrastructure 1102 and the ICP 1104 and may also include an API (not shown) for interfacing the network 190 and a storage (not shown) for storing both state and configuration information in a similar manner previously described. The cluster state 1114 is for managing a cluster of machines at least including a machine C 1106 in the infrastructure 1102 and another machine D 1126 that is not located in the infrastructure 1102. Instead, the machine D 1126 is located within an infrastructure 1122 of another data center 1120 of the federation 100, which is managed by an ICP 1124. Although not shown, the 1120 may also include an API for interfacing the network 190 and a storage for storing both state and configuration information in a similar manner previously described. The ICP 1104 maintains a machine state C 1110 representing the machine C 1106 and includes links to a mirrored machine state D 1112 representing the machine D 1126. The ICP 1124 maintains a machine state D 1130 representing the machine D 1126 of the data center 1120, in which the mirrored machine state D 1112 is a mirrored copy of the machine state D 1130.

Similar to the cluster state 1024, the cluster state 1114 is a conceptual model that does not have a direct mapping to a VM or a PM. Nonetheless, the cluster state 1114 includes references to the machine states C and D which are considered part of the same cluster of machines. The cluster state 1114 may have both independent state and dependent state managed as references to other items including the machine states C and D. The cluster state 1114 may exist as a data set of a cluster of machines, such as including the machines C and D. The cluster state 1114 includes information that is shared among the machines of the same cluster. The cluster state 1114 may provide a means of performing operations of each of the machines in the cluster, such as an upgrade or the like of each of the machines. The cluster state 1114 does not have any physical machine to run a local context.

The ICP 1104 generates and manages execution of a workflow 1116 including any number of tasks for performing any suitable function or operation for the cluster state 1114. While running the workflow 1116 for the cluster state 1114, an agent C 1108 on machine C executes task T1 and updates the machine state C. In addition, an agent D 1128 on machine D located in the data center 1120 executes task T2 and updates the machine state D. When the machine state D 1130 is updated, the updates are reflected back or copied to the mirrored machine state D 1112 and reflected as updates to the cluster state 1114. The ICP 1124 also maintains a mirrored copy of the cluster state 1114, shown as mirrored cluster state 1134. The updates to the cluster state 1114 are copied to the mirrored cluster state 1134.

The present description has been presented to enable one of ordinary skill in the art to make and use the present invention as provided within the context of particular applications and corresponding requirements. The present invention is not intended, however, to be limited to the particular embodiments shown and described herein, but is to be accorded the widest scope consistent with the principles and novel features herein disclosed. Many other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention.

The invention claimed is:

1. A system for dynamic context automation workflow, comprising:
a data center comprising:
an infrastructure comprising physical resources for implementing at least one machine; and
a configuration platform comprising a computer server including a configuration processor, wherein the computer server is configured to operate as an infrastructure controller to manage the configuration and operating functions of the infrastructure; and
wherein the configuration processor coordinates platform is configured to generate a workflow comprising a sequential plurality of tasks to effectuate a change of the infrastructure and to coordinate automatic sequential execution of the plurality of tasks of the workflow by a plurality of different agents each running on a different one of a plurality of different contexts for updating a machine and to update the state representation of the infrastructure using update information received from the plurality of agents controlled by the configuration processor.

2. The system of claim 1, wherein for each of the plurality of tasks of the workflow, the configuration processor platform determines one of the plurality of contexts for executing a next task, provides access to the next task and a current instance of the a machine state to an agent of the determined context, receives machine state update information from the agent of the determined context after execution of the next task, and updates the machine state using the received machine state update information.

3. The system of claim 1, wherein the configuration processor platform generates the workflow from stored configuration information in response to a command.

4. The system of claim 1, wherein the configuration processor platform generates the workflow and the a machine state as a placeholder in response to a provisioning command, and wherein the workflow comprises at least one task that is executed and completed by a first agent in a first context before the machine is actually provisioned within the infrastructure.

5. The system of claim 1, wherein the at least one of the plurality of contexts comprises a managed process located within the data center and outside the configuration platform.

6. The system of claim 1, wherein the at least one of the plurality of contexts comprises a process located within the configuration platform.

7. The system of claim 1, wherein the at least one of the plurality of contexts comprises a machine implemented in the infrastructure.

8. The system of claim 1, wherein the configuration platform comprises a network interface for communicating via a communications network, and wherein the at least one of the plurality of contexts comprises a process located in a second data center accessible via the communications network.

9. The system of claim 1, wherein the configuration platform comprises a network interface for communicating via a communications network, and wherein the plurality of contexts comprises a plurality of processes each located in a corresponding one of a plurality of data centers accessible via the communications network.

10. The system of claim 1, wherein at least one of the plurality of tasks specifically identifies one of the plurality of contexts in which the task is to be executed.

11. The system of claim 1, wherein the configuration processor platform spawns a new process space for providing a context for executing at least one of the plurality of tasks.

12. The system of claim 1, further comprising: a plurality of machines of a cluster implemented in the infrastructure; a plurality of machine states each representing a corresponding one of the plurality of implemented machines; and a cluster state that represents the cluster and that includes references to each of the plurality of machine states; wherein the configuration processor platform coordinates automatic sequential execution of the plurality of tasks of the workflow for updating the cluster state on behalf of the plurality of machines of the cluster.

13. The system of claim 12, wherein one of the plurality of contexts comprises a process space owned by the cluster state for performing at least one task of the workflow on behalf of the machines of the cluster.

14. The system of claim 1, wherein the data center comprises a first data center comprising a first infrastructure, the system further comprising: a second data center comprising a second infrastructure for implementing at least one machine; a plurality of machines of a cluster including at least one machine implemented in the first infrastructure and at least one machine implemented in the second infrastructure; a plurality of machine states each representing a corresponding one of the plurality of implemented machines; and a cluster state that represents the cluster and that includes references to each of the plurality of machine states in the first and second infrastructures; wherein the configuration processor platform coordinates automatic sequential execution of the plurality of tasks of the workflow for updating the cluster state on behalf of the plurality of machines of the cluster.

15. A method of effectuating a state change of an infrastructure of a data center, the data center including the infrastructure comprising physical resources for implementing at least one machine managed by a configuration platform comprising a computer server that is configured to operate as an infrastructure controller to manage the configuration and operating functions of the infrastructure, wherein said method comprises: generating, by the configuration platform, a workflow comprising a sequential plurality of tasks; and coordinating automatic sequential execution of a plurality of tasks of the workflow including, for each of the plurality of tasks: enabling access by one of a plurality of agents of an identified one of a plurality of contexts located at one of a corresponding plurality of different execution locations for executing a corresponding task; receiving update information from the corresponding agent after executing the corresponding task; and updating a state representation of the infrastructure using the update information.

16. The method of claim 15, wherein the data center includes a configuration storage, and wherein said generating a workflow includes accessing, by the configuration platform, configuration information from the configuration storage.

17. The method of claim 15, wherein said updating a state representation of the infrastructure comprises updating a machine state representation of a machine of the infrastructure.

18. The method of claim 15, wherein said updating a state representation of the infrastructure comprises provisioning a new machine of the infrastructure.

19. The method of claim 15, wherein said generating a workflow includes selecting one of the plurality of contexts for each of the plurality of tasks of the workflow.

20. The method of claim 19, wherein said selecting comprises retrieving a context identifier from a corresponding task.

21. The method of claim 19, further comprising retrieving requirements and parameters from a corresponding task for determining an identified context.

22. The method of claim 19, further comprising evaluating a corresponding task for requirements and parameters for execution of the corresponding task for determining an identified context.

23. The method of claim 15, further comprising transferring execution to an agent of each of the plurality of contexts for executing a corresponding one of the plurality of tasks of the workflow.

24. The method of claim 15, further comprising installing a corresponding agent of the identified context prior to enabling the corresponding agent.

* * * * *